S. HARTWELL.
POTATO-BUG TRAPS.
No. 194,429. Patented Aug. 21, 1877.
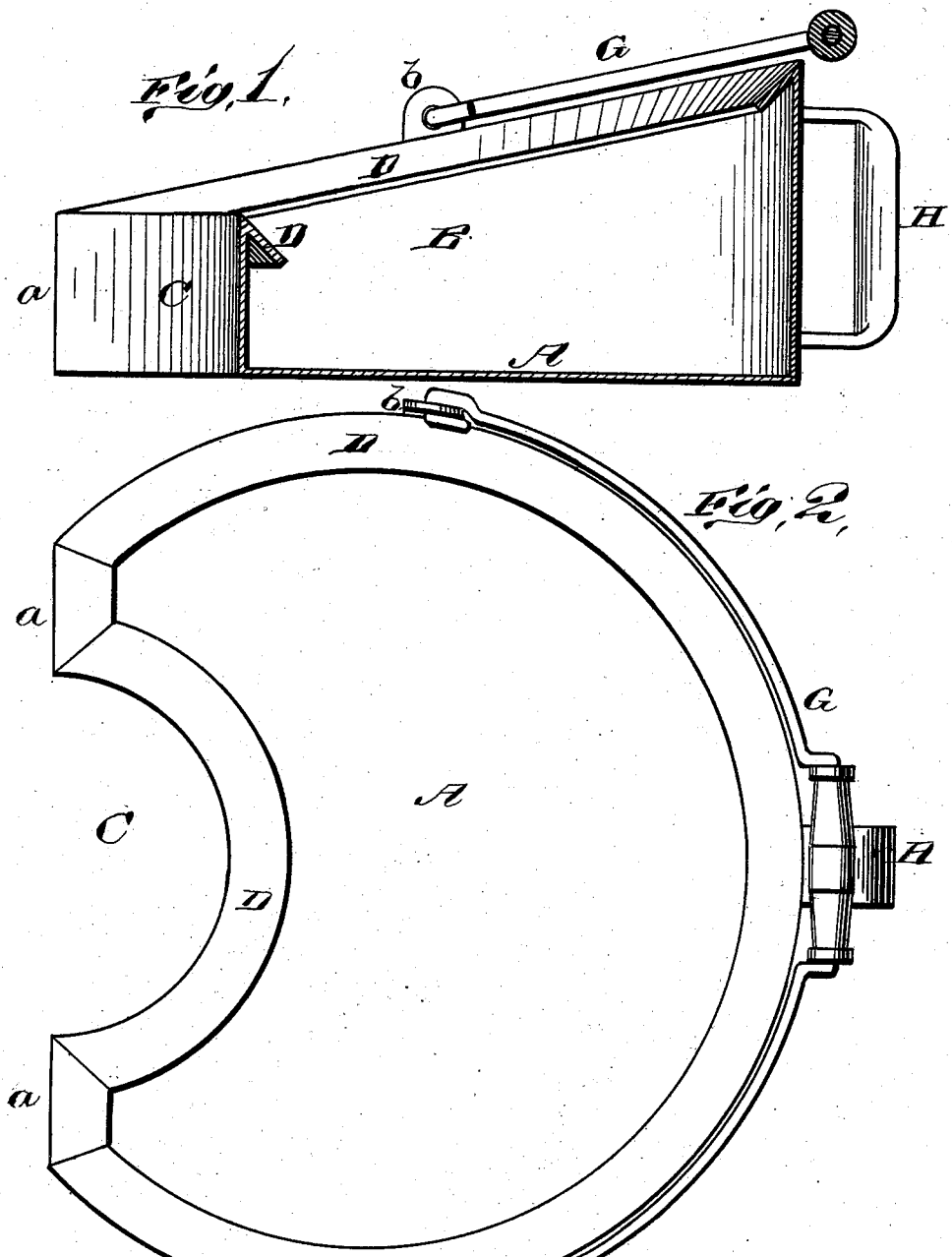

UNITED STATES PATENT OFFICE.

SAMUEL HARTWELL, OF LINCOLN, MASSACHUSETTS.

IMPROVEMENT IN POTATO-BUG TRAPS.

Specification forming part of Letters Patent No. 194,429, dated August 21, 1877; application filed July 14, 1877.

*To all whom it may concern:*

Be it known that I, SAMUEL HARTWELL, of Lincoln, in the county of Middlesex and State of Massachusetts, have invented a new and valuable Improvement in Potato-Bug Traps; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical sectional view of my potato-bug trap, and Fig. 2 is a plan view of the same.

The nature of my invention consists in the construction and arrangement of a trap for catching potato-bugs, as will be hereinafter more fully set forth.

The annexed drawings, to which reference is made, fully illustrate my invention.

My trap for catching potato-bugs is in the form of a nearly-circular pan, of which A is the bottom, and B the sides. The bottom A is in the form of a segment of about three-fourths of a circle, and in the cut-off part is made a semicircular recess, C, leaving at each end of said recess a short straight part at $a$. The rim or sides B extend vertically upward around this bottom, as shown. Along the front of the pan—that is, at the recess C and parts $a$ $a$—the rim B is of uniform height, while from the same, around each side, it inclines upward, gradually increasing in height to the back. The rim B is, around its entire upper edge, provided with a flange, D, inclining inward and downward, substantially as shown.

The pan thus constructed is provided with a hinged bail, G, connected to ears $b$ $b$ on the sides of the pan, and on the back it has a stationary handle, H.

The pan or trap is held by means of the handle H against the potato-vine, so that the recess C will encircle the plant. The vine is then bent over the pan and shaken gently, when the potato-bugs will drop off the vines into the pan, from whence they cannot escape on account of the flange D.

When the pan is full it is carried by the bail G to any suitable place for killing the bugs.

What I claim as new, and desire to secure by Letters Patent, is—

The trap for catching potato-bugs herein described, consisting of the bottom A, circular wall B, inclining from rear to front, sides $a$ $a$, semicircular recess C, continuous inclined flange D, stationary handle H, and hinged bail G, as and for the purpose set forth.

In testimony that I claim the above I have hereunto subscribed my name in the presence of two witnesses.

SAMUEL HARTWELL.

Witnesses:
 RICHD. BARRETT,
 GEO. HEYWOOD.